(12) United States Patent
Machlev et al.

(10) Patent No.: US 11,045,981 B2
(45) Date of Patent: Jun. 29, 2021

(54) PROCESSING MACHINE AND METHODS FOR PROCESSING DIP-MOLDED ARTICLES

(71) Applicant: Ortho-Space Ltd., Caesarea (IL)

(72) Inventors: Eli Machlev, Caesarea (IL); Ofer Levin, Caesarea (IL); Ziv Shabat, Caesarea (IL); Yoav Meiraz, Caesarea (IL); Omar Elmalak, Caesarea (IL)

(73) Assignee: Ortho-Space Ltd.

( * ) Notice: Subject to any disclaimer, the term of this patent is extended or adjusted under 35 U.S.C. 154(b) by 0 days.

(21) Appl. No.: 16/482,102

(22) PCT Filed: Oct. 31, 2017

(86) PCT No.: PCT/IB2017/056776
§ 371 (c)(1),
(2) Date: Jul. 30, 2019

(87) PCT Pub. No.: WO2018/138561
PCT Pub. Date: Aug. 2, 2018

(65) Prior Publication Data
US 2020/0223108 A1 Jul. 16, 2020

Related U.S. Application Data

(60) Provisional application No. 62/451,960, filed on Jan. 30, 2017.

(51) Int. Cl.
*B29C 41/42* (2006.01)
*B29C 41/14* (2006.01)
*B29L 31/00* (2006.01)

(52) U.S. Cl.
CPC .............. *B29C 41/42* (2013.01); *B29C 41/14* (2013.01); *B29K 2889/00* (2013.01); *B29L 2031/753* (2013.01)

(58) Field of Classification Search
CPC .. B65H 18/22; B65H 18/26; B65H 2701/177; B65H 2701/1846; B65H 2301/4138;
(Continued)

(56) References Cited

U.S. PATENT DOCUMENTS 2,389,319 A    11/1945   McMordie et al.
3,631,854 A    1/1972   Fryer
(Continued)

FOREIGN PATENT DOCUMENTS

EP    0441516 A2   8/1991
EP    0617930 A1   10/1994
(Continued)

OTHER PUBLICATIONS

International Search Report for Application No. PCT/IB2017/056776 dated Apr. 6, 2018, 4 pages.
(Continued)

*Primary Examiner* — Joseph S Del Sole
*Assistant Examiner* — Mohamed K Ahmed Ali
(74) *Attorney, Agent, or Firm* — Lerner, David, Littenberg, Krumholz & Mentlik, LLP (57) ABSTRACT

Processes for the manufacturing of dip-molded articles can include the application of compression to remove molding materials from within the dip-molded articles. In some embodiments, inflatable implantable medical devices are dip-molded and can be manufactured using such compression processes.

18 Claims, 4 Drawing Sheets

(58) Field of Classification Search
CPC ............ B65H 2701/1922; B65B 63/04; B65B 63/024; B28B 3/123; B30B 5/06
See application file for complete search history.

(56) References Cited

U.S. PATENT DOCUMENTS

| | | | |
|---|---|---|---|
| 3,701,771 A | 10/1972 | Almen et al. | |
| 3,800,788 A | 4/1974 | White | |
| 4,364,921 A | 12/1982 | Speck et al. | |
| 4,583,697 A * | 4/1986 | Bichot | B65H 18/16 242/534 |
| 4,638,803 A | 1/1987 | Rand | |
| 4,662,883 A | 5/1987 | Bell et al. | |
| 4,669,478 A | 6/1987 | Robertson | |
| 4,719,918 A | 1/1988 | Bonomo et al. | |
| 4,798,205 A | 1/1989 | Bonomo et al. | |
| 4,819,637 A | 4/1989 | Dormandy, Jr. et al. | |
| 4,822,541 A | 4/1989 | Nagai et al. | |
| 4,892,550 A | 1/1990 | Huebsch | |
| 4,906,244 A | 3/1990 | Pinchuk et al. | |
| 4,932,938 A | 6/1990 | Goldberg et al. | |
| 4,932,956 A | 6/1990 | Reddy et al. | |
| 4,932,958 A | 6/1990 | Reddy et al. | |
| 5,002,556 A | 3/1991 | Ishida et al. | |
| 5,021,043 A | 6/1991 | Becker et al. | |
| 5,033,481 A | 7/1991 | Heyler, III | |
| 5,071,410 A | 12/1991 | Pazell | |
| 5,071,429 A | 12/1991 | Pinchuk et al. | |
| 5,102,413 A | 4/1992 | Poddar | |
| 5,122,113 A | 6/1992 | Rattler | |
| 5,163,949 A | 11/1992 | Bonutti | |
| 5,163,950 A | 11/1992 | Pinchuk et al. | |
| 5,176,698 A | 1/1993 | Burns et al. | |
| 5,181,921 A | 1/1993 | Makita et al. | |
| 5,222,970 A | 6/1993 | Reeves | |
| 5,295,994 A | 3/1994 | Bonutti | |
| 5,305,963 A | 4/1994 | Harvey, III et al. | |
| 5,331,975 A | 7/1994 | Bonutti | |
| 5,344,451 A | 9/1994 | Dayton | |
| 5,344,459 A | 9/1994 | Swartz | |
| 5,370,691 A | 12/1994 | Samson | |
| 5,423,850 A | 6/1995 | Berger | |
| 5,425,357 A | 6/1995 | Moll et al. | |
| 5,468,245 A | 11/1995 | Vargas, III | |
| 5,480,400 A | 1/1996 | Berger | |
| 5,507,770 A | 4/1996 | Turk | |
| 5,514,153 A | 5/1996 | Bonutti | |
| 5,524,633 A | 6/1996 | Heaven et al. | |
| 5,549,625 A | 8/1996 | Bircoll | |
| 5,571,179 A | 11/1996 | Manders et al. | |
| 5,575,759 A | 11/1996 | Moll et al. | |
| 5,632,762 A | 5/1997 | Myler | |
| 5,645,560 A | 7/1997 | Crocker et al. | |
| 5,658,310 A | 8/1997 | Berger | |
| 5,658,329 A | 8/1997 | Purkait | |
| 5,662,712 A | 9/1997 | Pathak et al. | |
| 5,667,520 A | 9/1997 | Bonutti | |
| 5,683,405 A | 11/1997 | Yacoubian et al. | |
| 5,704,893 A | 1/1998 | Timm | |
| 5,720,762 A | 2/1998 | Bass | |
| 5,725,568 A | 3/1998 | Hastings | |
| 5,746,762 A | 5/1998 | Bass | |
| 5,746,763 A | 5/1998 | Benderev et al. | |
| 5,779,672 A | 7/1998 | Dormandy, Jr. | |
| 5,779,728 A | 7/1998 | Lunsford et al. | |
| 5,798,096 A | 8/1998 | Pavlyk | |
| 5,823,995 A | 10/1998 | Fitzmaurice et al. | |
| 5,827,289 A | 10/1998 | Reiley et al. | |
| 5,827,318 A | 10/1998 | Bonutti | |
| 5,843,116 A | 12/1998 | Crocker et al. | |
| 5,860,997 A | 1/1999 | Bonutti | |
| 5,871,537 A | 2/1999 | Holman et al. | |
| 5,888,196 A | 3/1999 | Bonutti | |
| 5,909,800 A | 6/1999 | Huang | |
| 5,925,058 A | 7/1999 | Smith et al. | |
| 5,935,667 A | 8/1999 | Calcote et al. | |
| 5,941,909 A | 8/1999 | Purkait | |
| 5,954,739 A | 9/1999 | Bonutti | |
| 5,968,068 A | 10/1999 | Dehdashtian et al. | |
| 5,971,992 A | 10/1999 | Solar | |
| 5,972,015 A | 10/1999 | Scribner et al. | |
| 5,979,452 A | 11/1999 | Fogarty et al. | |
| 5,984,942 A | 11/1999 | Alden et al. | |
| 6,017,305 A | 1/2000 | Bonutti | |
| 6,018,094 A | 1/2000 | Fox | |
| 6,027,486 A | 2/2000 | Crocker et al. | |
| 6,027,517 A | 2/2000 | Crocker et al. | |
| 6,036,640 A | 3/2000 | Corace et al. | |
| 6,042,596 A | 3/2000 | Bonutti | |
| 6,066,154 A | 5/2000 | Reiley et al. | |
| 6,068,626 A | 5/2000 | Harrington et al. | |
| 6,074,341 A | 6/2000 | Anderson et al. | |
| 6,099,547 A | 8/2000 | Gellman et al. | |
| 6,106,541 A | 8/2000 | Hurbis | |
| 6,117,165 A | 9/2000 | Becker | |
| 6,120,523 A | 9/2000 | Crocker et al. | |
| 6,171,236 B1 | 1/2001 | Bonutti | |
| 6,186,978 B1 | 2/2001 | Samson et al. | |
| 6,187,023 B1 | 2/2001 | Bonutti | |
| 6,235,043 B1 | 5/2001 | Reiley et al. | |
| 6,240,924 B1 | 6/2001 | Fogarty et al. | |
| 6,248,110 B1 | 6/2001 | Reiley et al. | |
| 6,248,131 B1 | 6/2001 | Felt et al. | |
| 6,280,456 B1 | 8/2001 | Scribner et al. | |
| 6,280,457 B1 | 8/2001 | Wallace et al. | |
| 6,293,960 B1 | 9/2001 | Ken | |
| 6,306,081 B1 | 10/2001 | Ishikawa et al. | |
| 6,306,177 B1 | 10/2001 | Felt et al. | |
| 6,312,462 B1 | 11/2001 | McDermott et al. | |
| 6,331,191 B1 | 12/2001 | Chobotov | |
| 6,352,551 B1 | 3/2002 | Wang | |
| 6,379,329 B1 | 4/2002 | Naglreiter et al. | |
| 6,391,538 B1 | 5/2002 | Vyavahare et al. | |
| 6,395,019 B2 | 5/2002 | Chobotov | |
| 6,395,208 B1 | 5/2002 | Herweck et al. | |
| 6,409,741 B1 | 6/2002 | Crocker et al. | |
| 6,409,749 B1 | 6/2002 | Maynard | |
| 6,419,701 B1 | 7/2002 | Cook et al. | |
| 6,423,032 B2 | 7/2002 | Parodi | |
| 6,423,083 B2 | 7/2002 | Reiley et al. | |
| 6,443,941 B1 | 9/2002 | Slepian et al. | |
| 6,451,042 B1 | 9/2002 | Bonutti | |
| 6,500,190 B2 | 12/2002 | Greene, Jr. et al. | |
| 6,503,265 B1 | 1/2003 | Fogarty et al. | |
| 6,530,878 B2 | 3/2003 | Silverman et al. | |
| 6,533,799 B1 | 3/2003 | Bouchier | |
| 6,547,767 B1 | 4/2003 | Moein | |
| 6,591,838 B2 | 7/2003 | Durgin | |
| 6,599,275 B1 | 7/2003 | Fischer, Jr. | |
| 6,607,544 B1 | 8/2003 | Boucher et al. | |
| 6,620,181 B1 | 9/2003 | Bonutti | |
| 6,623,505 B2 | 9/2003 | Scribner et al. | |
| 6,632,235 B2 | 10/2003 | Weikel et al. | |
| 6,652,587 B2 | 11/2003 | Felt et al. | |
| 6,663,647 B2 | 12/2003 | Reiley et al. | |
| 6,668,836 B1 | 12/2003 | Greenburg et al. | |
| 6,706,064 B1 | 3/2004 | Anson | |
| 6,716,216 B1 | 4/2004 | Boucher et al. | |
| 6,719,773 B1 | 4/2004 | Boucher et al. | |
| 6,746,465 B2 | 6/2004 | Diederich et al. | |
| 6,837,850 B2 | 1/2005 | Suddaby | |
| 6,860,892 B1 | 3/2005 | Tanaka et al. | |
| 6,872,215 B2 | 3/2005 | Crocker et al. | |
| 6,899,719 B2 | 5/2005 | Reiley et al. | |
| 6,958,212 B1 | 10/2005 | Hubbell et al. | |
| 6,979,341 B2 | 12/2005 | Scribner et al. | |
| 6,981,980 B2 | 1/2006 | Sampson et al. | |
| 6,981,981 B2 | 1/2006 | Reiley et al. | |
| 7,001,431 B2 | 2/2006 | Bao et al. | |
| 7,029,487 B2 | 4/2006 | Greene, Jr. et al. | |
| 7,044,954 B2 | 5/2006 | Reiley et al. | |
| 7,060,100 B2 | 6/2006 | Ferree et al. | |
| 7,156,860 B2 | 1/2007 | Wallsten | |
| 7,156,861 B2 | 1/2007 | Scribner et al. | |

(56) References Cited

U.S. PATENT DOCUMENTS

| | | |
|---|---|---|
| 7,160,325 B2 | 1/2007 | Morningstar |
| 7,166,121 B2 | 1/2007 | Reiley et al. |
| 7,201,762 B2 | 4/2007 | Greene, Jr. et al. |
| 7,217,273 B2 | 5/2007 | Bonutti |
| 7,226,481 B2 | 6/2007 | Kuslich |
| 7,241,303 B2 | 7/2007 | Reiss et al. |
| 7,261,720 B2 | 8/2007 | Stevens et al. |
| 7,320,709 B2 | 1/2008 | Felt et al. |
| 7,368,124 B2 | 5/2008 | Chun et al. |
| 7,476,235 B2 | 1/2009 | Diederich et al. |
| 7,488,337 B2 | 2/2009 | Saab et al. |
| 7,583,520 B2 | 9/2009 | Aso |
| 7,589,980 B2 | 9/2009 | Aso |
| 7,632,291 B2 | 12/2009 | Stephens et al. |
| 7,695,488 B2 | 4/2010 | Berenstein et al. |
| 7,699,894 B2 | 4/2010 | O'Neil et al. |
| 7,749,267 B2 | 7/2010 | Karmon |
| 8,317,865 B2 | 11/2012 | Osorio et al. |
| 8,328,875 B2 | 12/2012 | Linares |
| 8,377,135 B1 | 2/2013 | McLeod et al. |
| 8,556,971 B2 | 10/2013 | Lang |
| 8,632,601 B2 | 1/2014 | Howald et al. |
| 8,753,390 B2 | 6/2014 | Shohat |
| 8,771,363 B2 | 7/2014 | Grotz |
| 8,894,713 B2 | 11/2014 | Shohat et al. |
| 8,926,622 B2 | 1/2015 | McKay |
| 9,132,015 B2 | 9/2015 | Bromer |
| 9,289,307 B2 | 3/2016 | Shohat |
| 9,345,577 B2 | 5/2016 | Vanleeuwen et al. |
| 9,533,024 B2 | 1/2017 | Sevrain et al. |
| 9,545,316 B2 | 1/2017 | Ashley et al. |
| 9,545,321 B2 | 1/2017 | Hibri et al. |
| 9,585,761 B2 | 3/2017 | Teisen et al. |
| 9,687,353 B2 | 6/2017 | Afzal |
| 9,750,611 B2 | 9/2017 | Fell |
| 9,757,241 B2 | 9/2017 | Grotz |
| 9,770,337 B2 | 9/2017 | Shohat |
| 9,808,345 B2 | 11/2017 | Grotz |
| 9,949,838 B2 | 4/2018 | Vanleeuwen et al. |
| 10,004,605 B2 | 6/2018 | Grotz |
| 2001/0008976 A1 | 7/2001 | Wang |
| 2001/0011174 A1 | 8/2001 | Reiley et al. |
| 2001/0049531 A1 | 12/2001 | Reiley et al. |
| 2002/0013600 A1 | 1/2002 | Scribner et al. |
| 2002/0026195 A1 | 2/2002 | Layne et al. |
| 2002/0082608 A1 | 6/2002 | Reiley et al. |
| 2002/0127264 A1 | 9/2002 | Felt et al. |
| 2002/0143402 A1 | 10/2002 | Steinberg |
| 2002/0156489 A1 | 10/2002 | Gellman et al. |
| 2002/0161388 A1 | 10/2002 | Samuels et al. |
| 2002/0165570 A1 | 11/2002 | Mollenauer et al. |
| 2002/0173852 A1 | 11/2002 | Felt et al. |
| 2002/0177866 A1 | 11/2002 | Weikel et al. |
| 2002/0183778 A1 | 12/2002 | Reiley et al. |
| 2002/0183850 A1 | 12/2002 | Felt et al. |
| 2003/0018352 A1 | 1/2003 | Mollenauer et al. |
| 2003/0018388 A1 | 1/2003 | Comer |
| 2003/0023260 A1 | 1/2003 | Bonutti |
| 2003/0028211 A1 | 2/2003 | Crocker et al. |
| 2003/0032963 A1 | 2/2003 | Reiss et al. |
| 2003/0033017 A1 | 2/2003 | Lotz et al. |
| 2003/0036797 A1 | 2/2003 | Malaviya et al. |
| 2003/0074084 A1 | 4/2003 | Nakao |
| 2003/0093107 A1 | 5/2003 | Parsonage et al. |
| 2003/0114878 A1 | 6/2003 | Diederich et al. |
| 2003/0114934 A1 | 6/2003 | Steinberg |
| 2003/0130664 A1 | 7/2003 | Boucher et al. |
| 2003/0147935 A1 | 8/2003 | Binette et al. |
| 2003/0181800 A1 | 9/2003 | Bonutti |
| 2003/0191489 A1 | 10/2003 | Reiley et al. |
| 2003/0195547 A1 | 10/2003 | Scribner et al. |
| 2003/0212426 A1 | 11/2003 | Olson et al. |
| 2003/0216776 A1 | 11/2003 | Mollenauer et al. |
| 2003/0220648 A1 | 11/2003 | Osorio et al. |
| 2003/0229372 A1 | 12/2003 | Reiley et al. |
| 2003/0236513 A1 | 12/2003 | Schwarz et al. |
| 2004/0010263 A1 | 1/2004 | Boucher et al. |
| 2004/0093008 A1 | 5/2004 | Zamore |
| 2004/0097794 A1 | 5/2004 | Bonutti |
| 2004/0097949 A1 | 5/2004 | Bonutti |
| 2004/0098015 A1 | 5/2004 | Weikel et al. |
| 2004/0098016 A1 | 5/2004 | Bonutti |
| 2004/0098017 A1 | 5/2004 | Saab et al. |
| 2004/0107000 A1 | 6/2004 | Felt et al. |
| 2004/0117019 A1 | 6/2004 | Trieu et al. |
| 2004/0127930 A1 | 7/2004 | Bonutti |
| 2004/0133276 A1 | 7/2004 | Lang et al. |
| 2004/0138689 A1 | 7/2004 | Bonutti |
| 2004/0138690 A1 | 7/2004 | Bonutti |
| 2004/0143285 A1 | 7/2004 | Bonutti |
| 2004/0147811 A1 | 7/2004 | Diederich et al. |
| 2004/0153114 A1 | 8/2004 | Reiley et al. |
| 2004/0153115 A1 | 8/2004 | Reiley et al. |
| 2004/0167561 A1 | 8/2004 | Boucher et al. |
| 2004/0167562 A1 | 8/2004 | Osorio et al. |
| 2004/0167563 A1 | 8/2004 | Fogarty et al. |
| 2004/0175408 A1 | 9/2004 | Chun et al. |
| 2004/0186504 A1 | 9/2004 | Schulter et al. |
| 2004/0220669 A1 | 11/2004 | Studer |
| 2004/0230218 A1 | 11/2004 | Criscuolo et al. |
| 2004/0236425 A1 | 11/2004 | Huang |
| 2004/0243170 A1 | 12/2004 | Suresh et al. |
| 2004/0247641 A1 | 12/2004 | Felt et al. |
| 2005/0015140 A1 | 1/2005 | deBeer |
| 2005/0015154 A1 | 1/2005 | Lindsey et al. |
| 2005/0043808 A1 | 2/2005 | Felt et al. |
| 2005/0090852 A1 | 4/2005 | Layne et al. |
| 2005/0113937 A1 | 5/2005 | Binette et al. |
| 2005/0113938 A1 | 5/2005 | Jamiolkowski et al. |
| 2005/0119662 A1 | 6/2005 | Reiley et al. |
| 2005/0123581 A1 | 6/2005 | Ringeisen et al. |
| 2005/0131267 A1 | 6/2005 | Talmadge |
| 2005/0131268 A1 | 6/2005 | Talmadge |
| 2005/0131269 A1 | 6/2005 | Talmadge |
| 2005/0143836 A1 | 6/2005 | Steinberg |
| 2005/0177244 A1 | 8/2005 | Steinberg |
| 2005/0209629 A1 | 9/2005 | Kerr et al. |
| 2005/0229433 A1 | 10/2005 | Cachia |
| 2005/0234498 A1 | 10/2005 | Gronemeyer et al. |
| 2005/0245961 A1 | 11/2005 | Mollenauer et al. |
| 2005/0251195 A1 | 11/2005 | Wang |
| 2005/0261722 A1 | 11/2005 | Crocker et al. |
| 2006/0064169 A1 | 3/2006 | Ferree |
| 2006/0069403 A1 | 3/2006 | Shalon et al. |
| 2006/0085022 A1 | 4/2006 | Hayes et al. |
| 2006/0085023 A1 | 4/2006 | Davies et al. |
| 2006/0085024 A1 | 4/2006 | Pepper et al. |
| 2006/0085080 A1 | 4/2006 | Bechgaard et al. |
| 2006/0095064 A1 | 5/2006 | Scribner et al. |
| 2006/0149380 A1 | 7/2006 | Lotz et al. |
| 2006/0173484 A1 | 8/2006 | Solomon |
| 2006/0229631 A1 | 10/2006 | Reiley et al. |
| 2006/0235460 A1 | 10/2006 | Reiley et al. |
| 2006/0241765 A1 | 10/2006 | Burn et al. |
| 2006/0276819 A1 | 12/2006 | Osorio et al. |
| 2006/0287665 A1 | 12/2006 | Burton et al. |
| 2007/0010844 A1 | 1/2007 | Gong et al. |
| 2007/0010845 A1 | 1/2007 | Gong et al. |
| 2007/0010846 A1 | 1/2007 | Leung et al. |
| 2007/0021769 A1 | 1/2007 | Scribner et al. |
| 2007/0049961 A1 | 3/2007 | Tsou et al. |
| 2007/0055300 A1 | 3/2007 | Osorio et al. |
| 2007/0060941 A1 | 3/2007 | Reiley et al. |
| 2007/0078477 A1 | 4/2007 | Heneveld et al. |
| 2007/0118171 A1 | 5/2007 | Reiley et al. |
| 2007/0162067 A1 | 7/2007 | Lunsford et al. |
| 2007/0167973 A1 | 7/2007 | Stupecky et al. |
| 2007/0186939 A1 | 8/2007 | Farmache |
| 2007/0190108 A1 | 8/2007 | Datta et al. |
| 2007/0213760 A1 | 9/2007 | Hayes et al. |
| 2007/0225705 A1 | 9/2007 | Osorio et al. |
| 2007/0225810 A1 | 9/2007 | Colleran et al. |
| 2007/0299455 A1 | 12/2007 | Stevens et al. |
| 2007/0299460 A9 | 12/2007 | Boucher et al. |

(56) References Cited

U.S. PATENT DOCUMENTS

| | | |
|---|---|---|
| 2008/0004596 A1 | 1/2008 | Yun et al. |
| 2008/0015626 A1 | 1/2008 | Keith et al. |
| 2008/0027470 A1 | 1/2008 | Hart et al. |
| 2008/0045994 A1 | 2/2008 | Rehnke |
| 2008/0051818 A1 | 2/2008 | Phan et al. |
| 2008/0051819 A1 | 2/2008 | Chasmawala et al. |
| 2008/0051825 A1 | 2/2008 | Reiley et al. |
| 2008/0058823 A1 | 3/2008 | Reiley et al. |
| 2008/0058824 A1 | 3/2008 | Reiley et al. |
| 2008/0058828 A1 | 3/2008 | Reiley et al. |
| 2008/0058855 A1 | 3/2008 | Reiley et al. |
| 2008/0058857 A1 | 3/2008 | Reiley et al. |
| 2008/0058943 A1 | 3/2008 | Reiley et al. |
| 2008/0065089 A1 | 3/2008 | Osorio et al. |
| 2008/0065137 A1 | 3/2008 | Boucher et al. |
| 2008/0065138 A1 | 3/2008 | Reiley et al. |
| 2008/0065139 A1 | 3/2008 | Scribner et al. |
| 2008/0065142 A1 | 3/2008 | Reiley et al. |
| 2008/0065143 A1 | 3/2008 | Reiley et al. |
| 2008/0065190 A1 | 3/2008 | Osorio et al. |
| 2008/0071385 A1 | 3/2008 | Binette et al. |
| 2008/0086133 A1 | 4/2008 | Kuslich et al. |
| 2008/0103518 A1 | 5/2008 | Karmon |
| 2008/0132934 A1 | 6/2008 | Reiley et al. |
| 2008/0132935 A1 | 6/2008 | Osorio et al. |
| 2008/0140079 A1 | 6/2008 | Osorio et al. |
| 2008/0140083 A1 | 6/2008 | Reiley et al. |
| 2008/0140084 A1 | 6/2008 | Osorio et al. |
| 2008/0154233 A1 | 6/2008 | Yao et al. |
| 2008/0172081 A1 | 7/2008 | Reiss et al. |
| 2008/0195112 A1 | 8/2008 | Liu et al. |
| 2008/0195207 A1 | 8/2008 | Lin et al. |
| 2008/0200989 A1 | 8/2008 | Cachia |
| 2008/0215031 A1 | 9/2008 | Belfort et al. |
| 2008/0221608 A1 | 9/2008 | Betts |
| 2008/0221628 A1 | 9/2008 | Milbocker et al. |
| 2008/0234820 A1 | 9/2008 | Felt et al. |
| 2008/0241213 A1 | 10/2008 | Chun et al. |
| 2008/0243122 A1 | 10/2008 | Kohm et al. |
| 2008/0249529 A1 | 10/2008 | Zarda et al. |
| 2008/0249603 A1 | 10/2008 | Schwardt et al. |
| 2008/0249604 A1 | 10/2008 | Donovan et al. |
| 2008/0255569 A1 | 10/2008 | Kohm et al. |
| 2008/0255624 A1 | 10/2008 | Arcenio et al. |
| 2008/0269748 A1 | 10/2008 | Justin et al. |
| 2008/0269759 A1 | 10/2008 | Reiley et al. |
| 2008/0269795 A1 | 10/2008 | Reiley et al. |
| 2008/0269796 A1 | 10/2008 | Reiley et al. |
| 2008/0275483 A1 | 11/2008 | Makower et al. |
| 2008/0281355 A1 | 11/2008 | Mayer et al. |
| 2008/0294187 A1 | 11/2008 | Krisht |
| 2008/0294205 A1 | 11/2008 | Greenhalgh et al. |
| 2008/0300604 A1 | 12/2008 | Lu et al. |
| 2009/0012618 A1 | 1/2009 | Ahrens et al. |
| 2009/0037148 A1 | 2/2009 | Lin et al. |
| 2009/0043344 A1 | 2/2009 | Schlotterback |
| 2009/0048623 A1 | 2/2009 | Lafosse et al. |
| 2009/0048684 A1 | 2/2009 | Lesh |
| 2009/0062871 A1 | 3/2009 | Chin et al. |
| 2009/0076318 A1 | 3/2009 | Li |
| 2009/0076517 A1 | 3/2009 | Reiley et al. |
| 2009/0082872 A1 | 3/2009 | Beger |
| 2009/0082874 A1 | 3/2009 | Cachia |
| 2009/0088788 A1 | 4/2009 | Mouw |
| 2009/0088789 A1 | 4/2009 | O'Neil et al. |
| 2009/0088846 A1 | 4/2009 | Myung et al. |
| 2009/0101157 A1 | 4/2009 | Karmon |
| 2009/0104586 A1 | 4/2009 | Cardoso et al. |
| 2009/0105527 A1 | 4/2009 | Connors et al. |
| 2009/0105732 A1 | 4/2009 | Yurek et al. |
| 2009/0105745 A1 | 4/2009 | Culbert |
| 2009/0112214 A1 | 4/2009 | Philippon et al. |
| 2009/0131952 A1 | 5/2009 | Schumacher et al. |
| 2009/0157084 A1 | 6/2009 | Aalsma et al. |
| 2009/0157087 A1 | 6/2009 | Wei et al. |
| 2009/0177206 A1 | 7/2009 | Lozier et al. |
| 2009/0182368 A1 | 7/2009 | Lunsford et al. |
| 2009/0201700 A1 | 8/2009 | Aso et al. |
| 2009/0234457 A1 | 9/2009 | Lotz et al. |
| 2010/0082036 A1 | 4/2010 | Reiley et al. |
| 2010/0090359 A1* | 4/2010 | Schuermann ............ B27N 3/14 264/40.1 |
| 2010/0114318 A1 | 5/2010 | Gittings et al. |
| 2010/0137923 A1 | 6/2010 | Greenhalgh et al. |
| 2010/0168755 A1 | 7/2010 | Reiley et al. |
| 2010/0292798 A1 | 11/2010 | Maestreth |
| 2011/0054408 A1 | 3/2011 | Wei et al. |
| 2011/0082552 A1 | 4/2011 | Wistrom et al. |
| 2011/0125158 A1 | 5/2011 | Diwan et al. |
| 2011/0144688 A1 | 6/2011 | Reiss et al. |
| 2011/0270393 A1 | 11/2011 | Marvel |
| 2011/0295370 A1 | 12/2011 | Suh et al. |
| 2011/0295379 A1 | 12/2011 | Shohat |
| 2012/0316645 A1 | 12/2012 | Grotz |
| 2013/0018479 A1 | 1/2013 | Grotz |
| 2013/0116794 A1 | 5/2013 | Shohat et al. |
| 2013/0325128 A1 | 12/2013 | Perloff et al. |
| 2013/0331946 A1 | 12/2013 | Shohat |
| 2014/0031939 A1 | 1/2014 | Wolfe et al. |
| 2014/0052250 A1 | 2/2014 | Wirtel, III et al. |
| 2014/0058432 A1 | 2/2014 | Scribner et al. |
| 2014/0066939 A1 | 3/2014 | Kaiser et al. |
| 2014/0128978 A1 | 5/2014 | Suh et al. |
| 2014/0142710 A1 | 5/2014 | Lang |
| 2014/0296987 A1 | 10/2014 | Shohat |
| 2014/0303730 A1 | 10/2014 | McGuire et al. |
| 2014/0378980 A1 | 12/2014 | Lomeli et al. |
| 2015/0127104 A1 | 5/2015 | Levy et al. |
| 2015/0289988 A1 | 10/2015 | Ashley et al. |
| 2015/0320570 A1 | 11/2015 | Suh et al. |
| 2015/0351914 A1 | 12/2015 | Bromer |
| 2016/0058548 A1 | 3/2016 | Grotz |
| 2016/0095706 A1 | 4/2016 | Grotz |
| 2016/0120654 A1 | 5/2016 | Hibri et al. |
| 2016/0199197 A1 | 7/2016 | Wolfe et al. |
| 2016/0235443 A1 | 8/2016 | Kaiser et al. |
| 2016/0310286 A1 | 10/2016 | McJunkin |
| 2016/0354182 A1 | 12/2016 | Karmon |
| 2017/0042698 A1 | 2/2017 | Saidha et al. |
| 2017/0119535 A1 | 5/2017 | Teisen et al. |
| 2017/0312088 A1 | 11/2017 | Grotz |
| 2018/0000603 A1 | 1/2018 | Shohat |
| 2018/0028319 A1 | 2/2018 | Grotz |
| 2018/0028326 A1 | 2/2018 | Vanleeuwen et al. |
| 2019/0217501 A1* | 7/2019 | Ricci ................ B28B 13/0215 |

FOREIGN PATENT DOCUMENTS

| | | | |
|---|---|---|---|
| EP | 1635738 | A2 | 3/2006 |
| JP | H0835164 | A | 2/1996 |
| WO | 9425078 | A1 | 11/1994 |
| WO | 9640023 | A1 | 12/1996 |
| WO | 9640024 | A1 | 12/1996 |
| WO | 9719653 | A1 | 6/1997 |
| WO | 9826737 | A1 | 6/1998 |
| WO | 9926737 | A1 | 1/1999 |
| WO | 9915116 | A1 | 4/1999 |
| WO | 0013624 | A2 | 3/2000 |
| WO | 0044808 | A1 | 8/2000 |
| WO | 0113832 | A1 | 3/2001 |
| WO | 0113833 | A1 | 3/2001 |
| WO | 03105917 | A2 | 12/2003 |
| WO | 2004112656 | A2 | 12/2004 |
| WO | 2014122595 | A1 | 8/2014 |

OTHER PUBLICATIONS

Written Opinion for International Application No. PCT/IB2017/056776 dated Apr. 6, 2018, 5 pages.

(56) References Cited

OTHER PUBLICATIONS

Supplementary European Search Report for Application No. EP 17894291 dated Oct. 31, 2019, 2 pages.

* cited by examiner

PROCESSING MACHINE AND METHODS FOR PROCESSING DIP-MOLDED ARTICLES

CROSS REFERENCE TO RELATED APPLICATIONS

The present application is a national phase entry under 35 U.S.C. § 371 of International Application No. PCT/IB2017/056776 filed Oct. 31, 2017, published in English as WO 2018/138561 A1, which claims priority from U.S. Provisional Application Ser. No. 62/451,960, filed Jan. 30, 2017, all of which are incorporated herein by reference.

FIELD AND BACKGROUND

1. Technical Field

This disclosure relates to the manufacturing of dip-molded articles. For example, this disclosure relates to the manufacturing of inflatable dip-molded implantable medical devices.

2. Background Information

Dip molding is performed by submerging a mold that will form the inside of the resulting article into a liquid polymer. A layer of the polymer coats the mold to form the article. After the polymer is sufficiently cured, the polymer article is separated from the mold.

The configurations of some dip-molded articles preclude the use of a rigid mold because the molded polymer article cannot be stripped from the rigid mold without damaging the article. For example, some balloon-like inflatable medical devices have a small orifice in comparison to the size of its internal space that is created by the mold. Hence, removing a rigid mold from the internal space through the small orifice may be difficult or impossible without tearing the molded polymer article.

SUMMARY

This disclosure describes processes for manufacturing dip-molded articles such as, but not limited to, dip-molded inflatable implantable medical devices used for the repair and treatment of tissues in bodily joints. More particularly, this disclosure describes apparatuses and methods for processing dip-molded inflatable implantable medical devices to remove substances that are used during dip molding process.

In one aspect, this document is directed to a dip-molded article processing machine. Such a dip-molded article processing machine can include a first conveyor assembly defining a first conveyor surface, a first compression section comprising one or more rollers with an outer peripheral surface spaced apart from the first conveyor surface by a first gap distance, and a second compression section comprising a second conveyor assembly defining a second conveyor surface. The second conveyor surface faces the first conveyor surface and is spaced apart from the first conveyor surface by a second gap distance.

Such a dip-molded article processing machine may optionally include one or more of the following features. The first conveyor surface and the second conveyor surface may be generally planar, non-parallel surfaces. The second gap distance may decrease along the longitudinal length of the second conveyor surface. The second gap distance may monotonically decrease along the longitudinal length of the second conveyor surface. The first gap distance may be greater than a minimum gap distance of the second gap distance. The machine may also include an electric motor that, when actuated, concurrently drives the first conveyor assembly, the one or more rollers, and the second conveyor assembly. The machine may also include a manual crank mechanism that, when rotated, concurrently drives the first conveyor assembly, the one or more rollers, and the second conveyor assembly. The machine may also include a power source configured to concurrently drive the first conveyor assembly, the one or more rollers, and the second conveyor assembly at a substantially equal linear speed. The first conveyor surface may be longer than the second conveyor surface. At least one of the first gap distance and the second gap distance may be adjustable. The second gap distance may differ along a longitudinal length of the second conveyor surface. The machine may also include one or more additional conveyor surfaces facing the first conveyor surface. The first conveyor surface may be longer than a combined length of the second conveyor surface and the one or more additional conveyor surfaces.

In another aspect, this disclosure is directed to a method for expelling contents from within a volumetric bladder. The method includes positioning the volumetric bladder on a first conveyor surface of a first conveyor assembly (wherein a contiguous gel material is contained within the volumetric bladder), and advancing the volumetric bladder along the first conveyor assembly such that the volumetric bladder receives compression between the first conveyor surface and a second conveyor surface of a second conveyor assembly. The compression expels at least some of the material out of the volumetric bladder.

Such a method for expelling contents from within a volumetric bladder may optionally include one or more of the following features. The compression may progressively increase as the volumetric bladder undergoes the advancing. The advancing may include the first conveyor surface, the second conveyor surface, and the inflatable medical device all moving at a same speed. The first conveyor surface and the second conveyor surface may be driven by rotation of a manual crank mechanism by a human operator or by an electric motor. During the advancing, a first compression applied to the volumetric bladder may convert the contiguous gel material to multiple smaller portions of gel material and a second compression applied to the volumetric bladder may expel at least some of the multiple smaller portions of the gel material out of the volumetric bladder. The first conveyor surface may be defined by a first conveyor belt and the second conveyor surface may be defined by a second conveyor belt. The volumetric bladder may be a biodegradable orthopedic spacer implant. The material may include semi-solid agar gel material. The first conveyor surface may be longer than the second conveyor surface. The volumetric bladder may receive additional compression between the first conveyor surface and a third conveyor surface of a third conveyor assembly. The additional compression may expel at least some additional amount of the material out of the volumetric bladder. The first conveyor surface and/or the second conveyor surface may be generally planar surfaces, and may be non-parallel to each other. The positioning may include orienting the volumetric bladder on the first conveyor surface such that an opening of the volumetric bladder is located at a trailing end of the volumetric bladder as the volumetric bladder undergoes the advancing. The volumetric bladder may be contained within a bag during the advancing, and the material expelled by the compression may be contained within the bag. The volumetric bladder may be a dip-molded inflatable medical device. The volumetric bladder may be a non-degradable orthopedic spacer implant.

Particular embodiments of the subject matter described in this document can be implemented to realize one or more of the following advantages. First, in some embodiments the apparatuses and methods described herein are used to remove molding material from within a dip-molded article while advantageously avoiding damage to the article. Second, the apparatuses and methods described herein can remove molding material from within a dip-molded article in an automated and, therefore, cost-effective manner. Third, the apparatuses and methods described herein remove molding material from within a dip-molded article in a clean manner that avoids contamination of the article, the machine, and the surrounding environment. Fourth, the apparatuses and methods described herein are designed to be adjustable, maintainable, and safe to operate.

Unless otherwise defined, all technical or/and scientific terms used herein have the same meaning as commonly understood by one of ordinary skill in the art to which the invention pertains. Although methods and materials similar or equivalent to those described herein can be used in the practice or testing of embodiments of the invention, exemplary methods or/and materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Like reference numbers represent corresponding parts throughout.

DETAILED DESCRIPTION

Some devices, such as, but not limited to, inflatable implantable medical devices, are manufactured using a dip molding process. While the disclosure provided herein is described in the context of inflatable implantable medical devices, many other types of articles other than inflatable implantable medical devices are also manufactured using dip molded processes, and are just as relevant to the subject matter described herein. Dip molding is performed by submerging a mold that will form the inside of the resulting article into a liquid material. A layer of the material coats the mold to form the article. After the material is sufficiently cured, the dip-molded article is separated from the mold.

The configurations of some dip-molded articles preclude the use of a rigid mold because the molded article cannot be stripped from the rigid mold without damaging the article. For example, some balloon-like inflatable medical devices have a small orifice in comparison to the size of its internal space that is created by the mold. Hence, removing a rigid mold from the internal space through the small orifice may be difficult or impossible without tearing the molded polymer article. In some cases, therefore, the mold is made at least partially from a material that can be converted or broken down into a flowable state or condition (as used herein, "flowable state" or "flowable condition" refers to a semi-solid material that is capable of being extracted through an orifice). While the molding material is in the flowable condition, the molding material can be gradually expelled out of the small orifice without damaging the molded polymer article. FIGS. 1-4 schematically represent such a process of manufacturing a polymer article.

Figure 1:
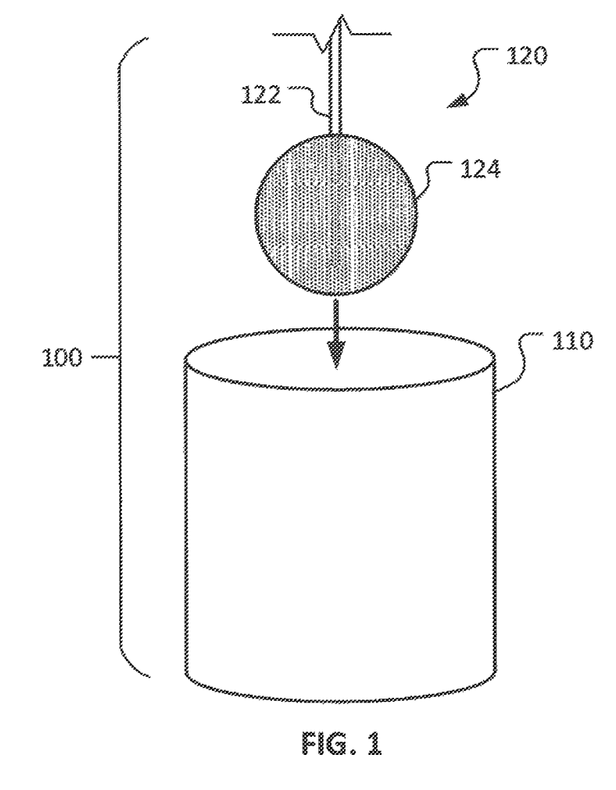
FIG. 1 is a schematic representation of a dip molding process.

Referring to FIG. 1, a simplified version of a dip molding process 100 is represented. For example, the dip molding process 100 can be performed using a polymer source 110 and a mold 120. The polymer source 110 (e.g., vat, tank, reservoir, etc.) contains a liquid polymer (e.g., silicone, plastisol, latex, neoprene, urethane, and other polymer dispersions or solutions). The mold 120 can be fully or partially submerged into the liquid polymer. After a period of time, the mold 120 is withdrawn from the polymer source 110, and a layer of the polymer will be covering the mold 120 (to the extent that the mold 120 was submerged in the polymer). After the polymer layer is sufficiently cured (i.e., solidified), the mold 120 will be removed from within the polymer (as described further below), resulting in a dip-molded polymeric article.

In the depicted example, the mold 120 includes a holder 122 and a mold member 124. The mold member 124 is removably attached to the holder 122. In this illustrative example, the mold member 124 is shaped as a disk and the holder 122 is an elongate shaft. It should be understood that the size and shape of the mold member 124 are selected in accordance with the desired attributes of the final dip-molded article that is to be made using the mold member 124. Hence, while the mold member 124 is a disk in this example, it should be understood that the concepts described herein are by no means limited to disk-shaped articles.

While in some cases rigid molds are used for dip molding processes, the mold member 124 of dip molding process 100 is made of a material that can later be converted into a flowable condition to facilitate its removal from within the dip-molded article. For example, in some cases the mold member 124 can be made of agar material which is a contiguous semi-solid gel-like substance at room temperature. In addition to agar, other materials such as, but not limited to, polysaccharides (e.g., alginates, carrageenan, pectin, chitosan, and agarose) and polymers such as hyaluronic acid albumin and gelatin may be used to make the mold member 124 in some cases.

The holder 122 is used to manipulate the mold member 124. For example, the holder 122 can be used as a handle for dipping the mold member 124 into the polymer source 110.

After removing the mold 120 from the polymer source 110, the coating on the mold 120 is given a chance to cure. Then the holder 122 is separated from the mold member 124.

Figure 2:
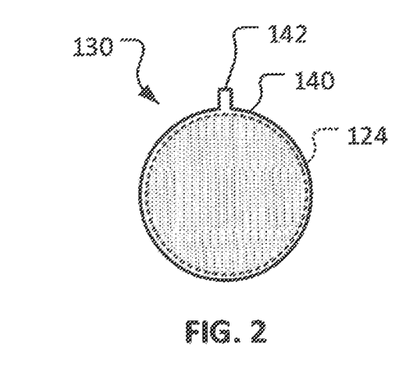
FIG. 2 is a schematic representation of a dip-molded article (within which a semi-solid molding material is contained) made by the dip molding process of FIG. 1.

Referring also to FIG. 2, after separating the holder 122, a resulting assembly 130 includes the mold member 124 surrounded by a dip-molded article 140. The dip-molded article 140 is a thin, continuous layer of flexible material (e.g., polymer in some embodiments) that adhered to the mold member 124 during the dip molding process 100. Hence, the dip-molded article 140 resembles the size and shape of the mold member 124, which in this example means the dip-molded article 140 resembles a disk-shaped balloon. The dip-molded article 140 includes a small orifice 142 that was created by the holder 122 during the dip molding process 100.

The next step of the process represented in FIGS. 1-4 is to remove the mold member 124 from the interior of the dip-molded article 140.

Figure 3:
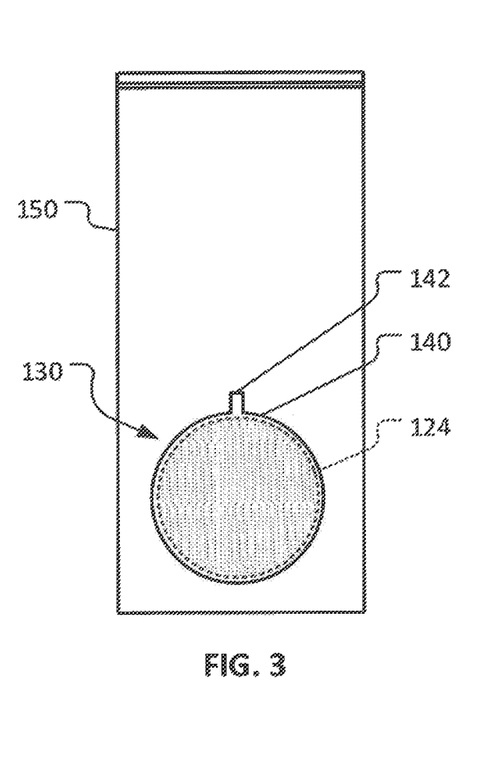
FIGS. 3 and 4 schematically represent a process for compressively expelling the semi-solid molding material out of the dip-molded article of FIG. 2.

Referring also to FIG. 3, in this example process the assembly 130 is then placed within a flexible container 150 (shown transparently here). The flexible container 150 can be a sealable polymer bag, for example. The flexible container 150 will serve to protect the dip-molded article 140 during the removal of the mold member 124, and will serve to contain the material of the mold member 124 after it is expelled from within the dip-molded article 140.

With the assembly 130 located within the flexible container 150, compression is applied to the assembly 130 (as described further below) to expel the material of the mold member 124 from within the dip-molded article 140. The material of the mold member 124 will be expelled through the orifice 142, without damaging the dip-molded article 140. Hence, the compression process converts the semi-solid gel-like mold member 124 to a flowable/extractable state to facilitate its removal from the dip-molded article 140 via the orifice 142.

Figure 4:
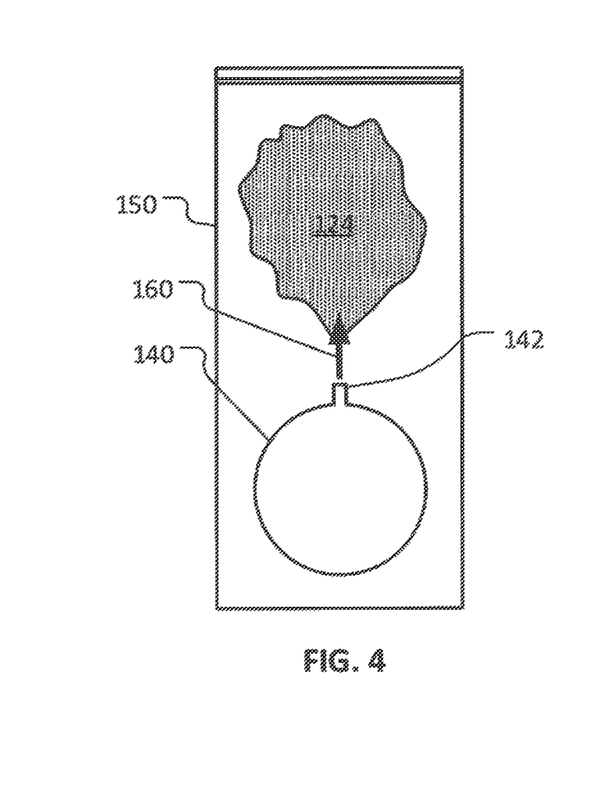

Referring also to FIG. 4, after the compression has expelled the mold member 124 material from the dip-molded article 140, the dip-molded article 140 is substantially void of the material of the mold member 124. The material of the mold member 124 that was expelled from within the dip-molded article 140 is neatly contained within the flexible container 150. Thereafter, the dip-molded article 140, being substantially void of the material of the mold member 124, can be removed from the flexible container 150 for further processing (e.g., rinsing, etc.).

Figures 5, 6:
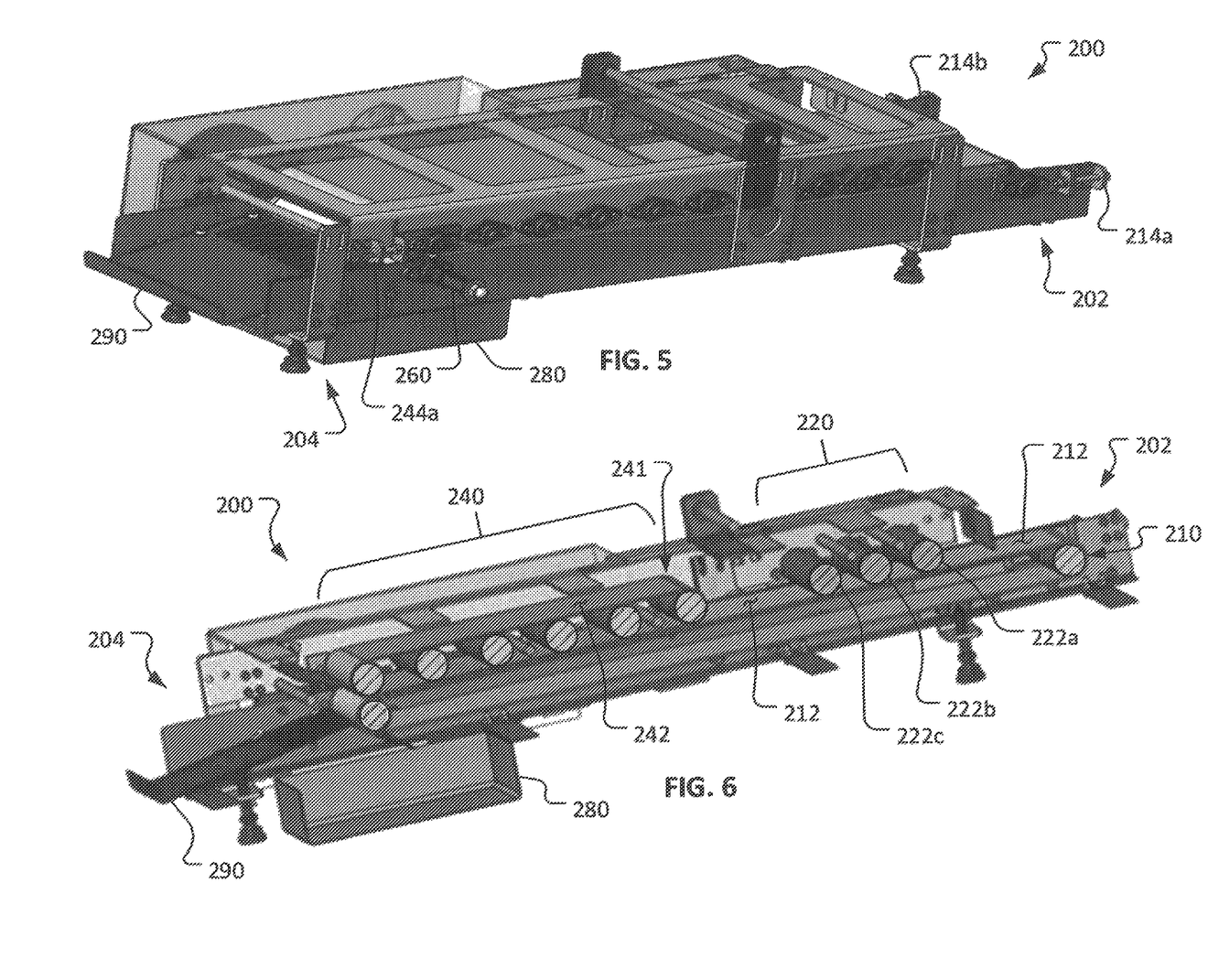
FIG. 5 is a perspective view of an example processing machine for compressively expelling a semi-solid molding material out of a dip-molded article.
FIG. 6 is a perspective longitudinal cross-sectional view of the processing machine of FIG. 5.

Referring to FIG. 5, an example machine 200 for compressively processing dip-molded articles containing semi-solid molding material includes an input end 202 and an output end 204. Broadly summarizing the function of the machine 200, the arrangement depicted in FIG. 3 can be inserted into the machine 200 at the input end 202 (with the orifice of the dip-molded article extending generally opposite to the direction the dip-molded article will travel through the machine 200), and the arrangement depicted in FIG. 4 will be ejected from the machine 200 at the output end 204. Between the input end 202 and the output end 204 are a series of mechanisms that apply compression to the dip-molded articles containing the semi-solid molding material. In result, the molding material is expelled from within the dip-molded articles.

Referring also to the longitudinal cross-sectional view of the machine 200 shown in FIG. 6, the machine 200 includes a first conveyor assembly 210. In the depicted embodiment, the first conveyor assembly 210 includes a first conveyor belt surface 212 that extends from the input end 202 to the output end 204. The first conveyor surface 212 provides a surface on which a flexible container holding a dip-molded article containing semi-solid molding material (e.g., as shown in FIG. 3) can be positioned while advancing through the machine 200. In some embodiments, the first conveyor surface 212 is a generally planar surface.

For the sake of brevity and clarity, hereafter: (i) the materials and arrangement of FIG. 3 will be referred to as the "pre-processed arrangement," (ii) the materials and arrangement that have received compression from machine 200 but prior to the expulsion of all molding material from the dip-molded article will be referred to as the "mid-processing arrangement," and (iii) the materials and arrangement of FIG. 4 will be referred to as the "post-processed arrangement." Collectively, the pre-processed arrangement, the mid-processing arrangement, and the post-processed arrangement will hereafter be referred to as the "work-in-process material" or "WIP material."

The first conveyor assembly 210 conveys the WIP material through the machine 200. In some embodiments, an electric motor is used as the power source for the conveyance. In some embodiments, manual exertion by a human operator is used as the power source for the conveyance. In some embodiments, a backing plate below the first conveyor belt surface 212 may be included to provide a stable foundation of support for the WIP material as it receives compression by the machine 200.

In some embodiments, the speed at which the first conveyor assembly 210 conveys the WIP material through the machine 200 results in a cycle time (i.e., the time to convert the pre-processed arrangement to the post-processed arrangement) ranging from about one minutes to about five minutes, or about 10 seconds to about three minutes, or about two minutes to about ten minutes, or any amount of time within those ranges, or any time more than ten minutes. In some embodiments, the speed is adjustable. In some embodiments, the speed is non-adjustable. In some embodiments, the speed may automatically vary depending on the location of the WIP material within the machine 200. In some cases, the speed is selected to be slow enough to substantially prevent incurring damage to the molded dip-molded article as the material of the mold member is expelled from the article.

In the depicted non-limiting example, the machine 200 includes a first compression section 220 and a second compression section 240. The first compression section 220 is nearer to the input end 202 than is the second compression section 240. Conversely, the second compression section 240 is nearer to the output end 204 than is the first compression section 220. Accordingly, as the WIP material advances through the machine 200 from the input end 202 to the output end 204, the WIP material first encounters the first compression section 220 and then subsequently encounters the second compression section 240.

The first compression section 220 converts the semi-solid gel-like material of the mold member in the pre-processed arrangement (e.g., mold member 124 of FIG. 3) into a flowable/extractable state. This is done in preparation for the later expulsion of the molding material from the dip-molded article. In other words, the first compression section 220 crushes and breaks up the continuity of the semi-solid gel-like material of the mold member to form pieces of the material that are suitable to be further processed by the second compression section 240. The second compression section processes the material into pieces that are small enough to fit through the orifice of the dip-molded article in a flowable/extractable manner.

In the depicted embodiment, the first compression section 220 includes a first compression roller 222a, a second compression roller 222b, and a third compression roller 222c. While the first compression section 220 of the depicted embodiment includes three compression rollers 222a, 222b, and 222c, in some embodiments one, two, four, five, six, seven, eight, nine, ten, or more than ten compression rollers are included.

In some embodiments, the compression rollers 222a, 222b, and 222c are driven rollers. That is, in some embodiments the compression rollers 222a, 222b, and 222c are rotationally driven by a motor or manual power. In some embodiments, the compression rollers 222a, 222b, and 222c are driven at a rotational speed that results in a surface speed on the periphery of the compression rollers 222a, 222b, and 222c that is substantially equal to the surface speed of the first conveyor belt 212. In some embodiments, the compression rollers 222a, 222b, and 222c are driven at a rotational speed that results in a surface speed on the periphery of the compression rollers 222a, 222b, and 222c that is less than or greater than the surface speed of the first conveyor surface 212. In some embodiments, the compression rollers 222a, 222b, and 222c are driven at a rotational speed that is variable and/or adjustable in relation to (or not in relation to) the surface speed of the first conveyor surface 212. In some embodiments, the compression rollers 222a, 222b, and 222c are not driven, but rather are idler rollers that may or may not turn in response to the WIP material being advanced by the first conveyor assembly 210.

In the depicted embodiment, the compression rollers 222a, 222b, and 222c are generally cylindrical with generally smooth outer surfaces. In some embodiments, one or more of the compression rollers 222a, 222b, and 222c may have shapes other than cylindrical and/or may have outer surfaces that are not smooth. For example, in some embodiments one or more of the compression rollers 222a, 222b, and 222c may have a polygonal, oval, or other regular or irregular cross-sectional shapes. In some embodiments, the outer surface of one or more of the compression rollers 222a, 222b, and 222c may include asperities, projections, texturing, knurling, and the like.

In some embodiments, the gap spaces between the compression rollers 222a, 222b, and 222c and the first conveyor surface 212 are all substantially equal to each other. In some embodiments, the gap space between one or more of the compression rollers 222a, 222b, and 222c and the first conveyor surface 212 may differ from the gap space between one or more of the other compression rollers 222a, 222b, and 222c and the first conveyor surface 212. For example, in some embodiments the gap spaces between the compression rollers 222a, 222b, and 222c and the first conveyor surface 212 may be progressively smaller as the WIP material is advanced (i.e., the gap space of the compression roller 222a being the largest, the gap space of the compression roller 222c being the smallest, and the gap space of the compression roller 222b being between the gap spaces of the compression rollers 222a and 222c). In some embodiments, the gap spaces of one or more (or all) of the compression rollers 222a, 222b, and 222c are adjustable (either individually or jointly). Any and all such aforementioned variations, and logical extrapolations thereof, pertaining to the first compression section 220 are envisioned, and are within the scope of this disclosure.

In some embodiments, the gap space between one or more (or all) of the compression rollers 222a, 222b, and 222c and the first conveyor surface 212 may be in a range, without limitation, from about 4 mm to about 6 mm, or about 3 mm to about 7 mm, or about 2 mm to about 8 mm, or about 4 mm to about 12 mm, or about 4 mm to about 10 mm, or about 4 mm to about 8 mm, or about 1 mm to about 6 mm.

In some embodiments, the machine 200 may include a warming device (e.g., infrared, ultrasonic, radiofrequency, microwave, radiator with water tank, etc.) that raises the temperature of the WIP material to make the material of the mold member less viscous (i.e., more flowable/extractable).

Still referring to FIGS. 5 and 6, the machine 200 also includes the second compression section 240. The second compression section 240 includes a second conveyor assembly 241 with a second conveyor surface 242. In some embodiments, the second conveyor surface 242 is generally planar. At least a portion of the second conveyor surface 242 faces the first conveyor surface 212 and is spaced apart from the first conveyor surface 212 so that the WIP material can be located therebetween. In some embodiments, the generally planar first conveyor surface 212 is non-parallel to the generally planar second conveyor surface 242.

The second compression section 240 applies a progressively increasing amount of compression to the WIP material as the WIP material is advanced along the second compression section 240. Accordingly, the material of the mold member within the dip-molded article is gradually expelled from the article as the WIP material advances along the second compression section 240.

In some embodiments, the gap spacing between the second conveyor surface 242 and the first conveyor surface 212 differs or is inconsistent along the length of the second conveyor surface 242. For example, in some embodiments the gap spacing between the second conveyor surface 242 and the first conveyor surface 212 decreases along the length of the second conveyor surface 242 (in the direction from the input end 202 toward the output end 204). In some embodiments, the gap spacing between the second conveyor surface 242 and the first conveyor surface 212 decreases monotonically along the length of the second conveyor surface 242. In some embodiments, the gap spacing between the second conveyor surface 242 and the first conveyor surface 212 decreases linearly along the length of the second conveyor surface 242. In some embodiments, the gap spacing between the second conveyor surface 242 and the first conveyor surface 212 decreases non-linearly along the length of the second conveyor surface 242. In some embodiments, the gap spacing between the second conveyor surface 242 and the first conveyor surface 212 is adjustable.

In some embodiments, the gap spacing between the second conveyor surface 242 and the first conveyor surface 212 is in a range of about 5 mm to about 6 mm at the widest spacing (e.g., at the initial interface between the surfaces 242 and 212) and lessens to a range of about 0.8 mm to about 1.0 mm at the narrowest spacing (e.g., near the output end 204). In such a case, the gap spacing in the middle of the second compression section 240 may be in a range of about 2 mm to about 3 mm. It should be understood that such gap spacing dimensional parameters are merely exemplary and all dimensions of gap spacing and variations thereof are envisioned and within the scope of this disclosure.

Figure 7:
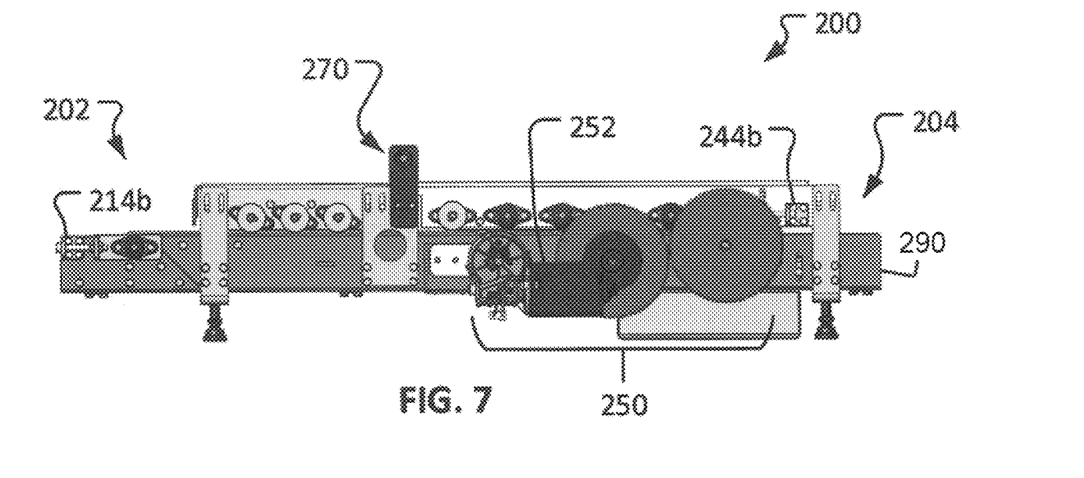
FIG. 7 is a side view of the processing machine of FIG. 5.

Referring also to FIG. 7, in some embodiments the machine 200 is motorized. For example, in the depicted embodiment the machine 200 includes a drive train 250 and an electric motor 252. In some embodiments, the motor 252 is a variable speed DC motor, and may be a gear motor. The drive train 250 transmits the rotary motion of the motor 252 to various driven portions of the machine 200, such as the first conveyor assembly 210, the first compression section 220, and/or the second conveyor assembly 241. In some embodiments, a quick release mechanism is included whereby the electric motor 252 can be decoupled from the drive train 250 for cleaning or the use of manual power input. For the use of manual power input, in some embodiments a manual hand crank input shaft 260 (refer to FIG. 5) can be used to manually power various driven portions of the machine 200, such as the first conveyor assembly 210, the first compression section 220, and/or the second conveyor assembly 241.

Figure 8:
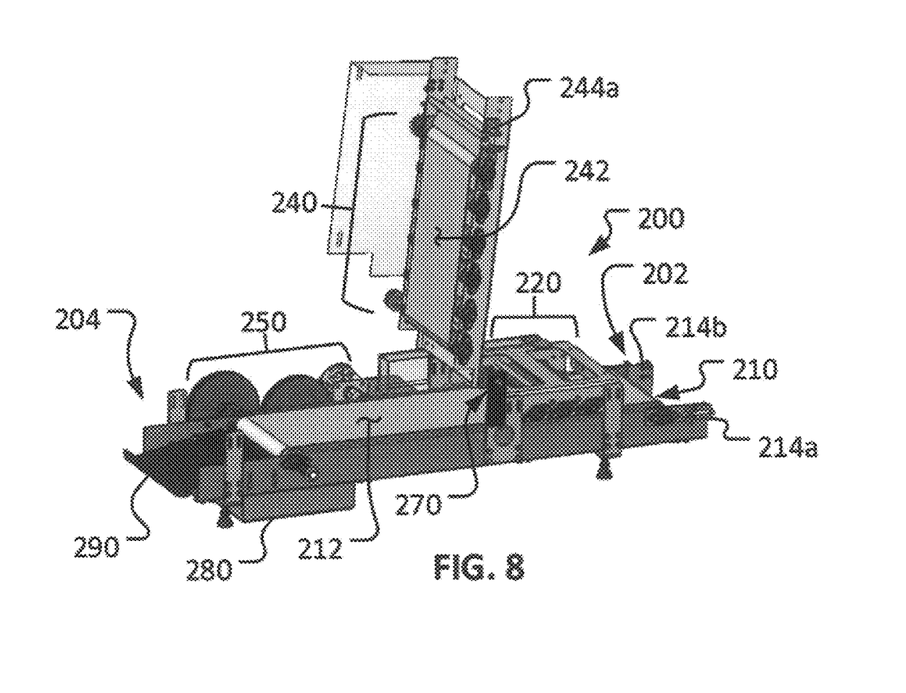
FIG. 8 is a perspective view of the processing machine of FIG. 5 shown in a different configuration.

Referring also to FIG. 8, in some embodiments the machine 200 includes a hinge mechanism 270 that allows the machine 200 to be at least partially opened for cleaning and/or maintenance. For example, in the depicted embodiment the hinge mechanism 270 is arranged to allow the second conveyor assembly 241 to be pivoted away from the first conveyor assembly 210. The drive train 250 is also conveniently configured to allow the second conveyor assembly 241 to be pivoted away from the first conveyor assembly 210 without requiring manual dismantling of the drive train 250.

In some embodiments, a receptacle 280 is included near the output end 204. Such a receptacle 280 can be used to catch materials such as the material of the mold member in some cases. In some embodiments, the receptacle 280 is configured as a sink and can collect water used for cleaning the machine 200. In some embodiments, also near the output end 204 is a tray 290 that can receive post-processed arrangement materials.

In some embodiments, one or more stationary brushes, portable brushes, and/or a combination thereof can be included that clean the conveyor surfaces 212 and/or 242 as the conveyor surfaces 212 and/or 242 pass by the brushes. In certain embodiments, cloths, abrasive pads, and/or other types of cleaning means can be included that clean the conveyor surfaces 212 and/or 242 as the conveyor surfaces 212 and/or 242 pass by.

In some embodiments, mechanisms are included for adjusting the tram of the conveyor rollers and/or adjusting the tension of the conveyor belts. For example, the first conveyor assembly 210 can include adjustment mechanisms 214a and 214b. Additionally, the second conveyor assembly 241 can include adjustment mechanisms 244a and 244b. Any additional conveyers may include additional adjustment mechanisms. Such adjustment mechanisms 214a-b and 244a-b can be manipulated to fine tune the positioning and orientation of the end conveyor rollers of the first conveyor assembly 210 and the second conveyor assembly 241 respectively.

In some embodiments, a third compression section is included. For example, in some embodiments a pressure plate is rammed against the mostly empty dip-molded article after processing the article through the second compression section 240. Such a third compression can expel a little more material of the mold member out of the dip-molded article. In some embodiments, the third compression section may be operated manually. In some embodiments, the third compression section may be operated automatically or by a motor.

In some embodiments, a hood (not shown) can be used to at least partially enclose the machine 200. The hood can enhance safe operations of the machine 200. In some embodiments, the hood is movable (e.g., pivotable) away from the machine 200 and a safety interlock switch is included to detect whether the hood is properly positioned. Hence, when the hood is moved away from the machine 200, the machine 200 is prevented from operating in some embodiments.

While the inventive concepts provided herein are described in the context of the manufacturing process of an inflatable medical implant, it should be understood that the inventive concepts are by no means limited to such a context. In fact, the inventive concepts can be applied for the manufacturing processes of many other dip-molded medical devices and for the manufacturing processes of non-medical devices that are dip-molded or manufactured in a method containing a mold and an external article, which may not be by dipping.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably.

The term 'about', as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment, may also be illustratively described and presented in the context or format of a plurality of separate embodiments.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A dip-molded article processing machine comprising:
    a first conveyor assembly defining a first conveyor surface;
    a first compression section comprising one or more compression rollers with an outer peripheral surface spaced apart from the first conveyor surface by a first gap distance, the compression rollers configured to directly contact the dip-molded article;
    a second compression section comprising a second conveyor assembly defining a second conveyor surface, the second conveyor surface facing the first conveyor surface and spaced apart from the first conveyor surface by a second gap distance, wherein the first gap distance is greater than a minimum gap distance of the second gap distance; and at least one an electric motor that, when actuated, concurrently drives the first conveyor assembly, the one or more compression rollers, and the second conveyor assembly.

2. The machine of claim 1, wherein the first conveyor surface and the second conveyor surface are generally planar, non-parallel surfaces.

3. The machine of claim 1, wherein the second gap distance decreases along the longitudinal length of the second conveyor surface.

4. The machine of claim 1, wherein the second gap distance monotonically decreases along the longitudinal length of the second conveyor surface.

5. The machine of claim 1, further comprising a power source configured to concurrently drive the first conveyor assembly, the one or more compression rollers, and the second conveyor assembly at a substantially equal linear speed.

6. The machine of claim 1, wherein at least one of the first gap distance and the second gap distance are adjustable.

7. The machine of claim 1, wherein the second gap distance differs along a longitudinal length of the second conveyor surface.

8. The machine of claim 1, further comprising one or more additional conveyor surfaces facing the first conveyor surface.

9. The machine of claim 8, wherein the first conveyor surface is longer than a combined length of the second conveyor surface and the one or more additional conveyor surfaces.

10. A dip-molded article processing machine comprising:
    a first conveyor assembly defining a first conveyor surface; a first compression section comprising one or more compression rollers with an outer peripheral surface spaced apart from the first conveyor surface by a first gap distance; the compression rollers configured to directly contact the dip-molded article;
    a second compression section comprising a second conveyor assembly defining a second conveyor surface, the second conveyor surface facing the first conveyor surface and spaced apart from the first conveyor surface by a second gap distance, wherein the first conveyor surface is longer than the second conveyor surface; and
    at least one an electric motor that, when actuated, concurrently drives the first conveyor assembly, the one or more compression rollers, and the second conveyor assembly.

11. The machine of claim 10, wherein the first conveyor surface and the second conveyor surface are generally planar, non-parallel surfaces.

12. The machine of claim 10, wherein the second gap distance decreases along the longitudinal length of the second conveyor surface.

13. The machine of claim 10, wherein the second gap distance monotonically decreases along the longitudinal length of the second conveyor surface.

14. The machine of claim 10, further comprising a power source configured to concurrently drive the first conveyor assembly, the one or more rollers, and the second conveyor assembly at a substantially equal linear speed.

15. The machine of claim 10, wherein at least one of the first gap distance and the second gap distance are adjustable.

16. The machine of claim 10, wherein the second gap distance differs along a longitudinal length of the second conveyor surface.

17. The machine of claim 10, further comprising one or more additional conveyor surfaces facing the first conveyor surface.

18. A dip-molded article processing machine comprising:
    a first conveyor assembly defining a first conveyor surface;
    a first compression section comprising one or more compression rollers with an outer peripheral surface spaced apart from the first conveyor surface by a first gap distance, the compression rollers configured to directly contact the dip-molded article;
    a second compression section comprising a second conveyor assembly defining a second conveyor surface, the second conveyor surface facing the first conveyor surface and spaced apart from the first conveyor surface by a second gap distance; and
    at least one manual crank mechanism that, when rotated, concurrently drives the first conveyor assembly, the one or more rollers, and the second conveyor assembly.

* * * * *